(12) United States Patent
Matsubara et al.

(10) Patent No.: US 10,891,542 B2
(45) Date of Patent: Jan. 12, 2021

(54) ISING DEVICE AND CONTROL METHOD THEREOF

(71) Applicant: FUJITSU LIMITED, Kawasaki (JP)

(72) Inventors: Satoshi Matsubara, Machida (JP); Hirotaka Tamura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 948 days.

(21) Appl. No.: 15/482,856

(22) Filed: Apr. 10, 2017

(65) Prior Publication Data
US 2017/0351949 A1 Dec. 7, 2017

(30) Foreign Application Priority Data

Jun. 6, 2016 (JP) .................. 2016-112551

(51) Int. Cl.
*G06N 3/063* (2006.01)
*G06N 3/04* (2006.01)

(52) U.S. Cl.
CPC ........... *G06N 3/049* (2013.01); *G06N 3/0445* (2013.01); *G06N 3/063* (2013.01)

(58) Field of Classification Search
CPC ....... G06N 3/049; G06N 3/0445; G06N 3/063
See application file for complete search history.

(56) References Cited

U.S. PATENT DOCUMENTS 5,404,556 A * 4/1995 Mahowald .............. G06F 13/36
706/41

FOREIGN PATENT DOCUMENTS

JP 3-100857 4/1991

OTHER PUBLICATIONS

HongBing Zhu, Mamoru Sasaki, "Introducing a Parallel Transit Evaluation Method into the Sequential Boltzmann Machine", Electronics and Communications in Japan, Part 3, vol. 81, No. 12, 1998, pp. 55-66 (Year: 1998).*

Marcin Skubiszewski, "An Exact Hardware Implementation of the Boltzmann Machine", Digital Equipment corporation Paris Research Laboratory, May 5, 1992, pp. 1-18. (Year: 1992).*

Shigeo Sato, Ken Nemoto, Shunsuke Akimotom, Mitsunaga Kinjo, Koji Nakajima, "Implementation of a New Neurochip Using Stochastic Logic", user transactions on neural networks, vol. 14, No. 5, Sep. 2003, pp. 1122-1128 (Year: 2003).*

(Continued)

*Primary Examiner* — Kakali Chaki
*Assistant Examiner* — Vasyl Dykyy
(74) *Attorney, Agent, or Firm* — Fujitsu Patent Center

(57) ABSTRACT

An individual neuron circuit calculates a first value based on a sum of products each obtained by multiplying one of weight values, each representing connection or disconnection between a corresponding neuron circuit and one of the other neuron circuits, by a corresponding one of output signals of the other neuron circuits and outputs 0 or 1, based on a result of comparison between a second value obtained by adding a noise value to the first value and a threshold. An arbitration circuit allows, when first output signals of first neuron circuits interconnected among the neuron circuits simultaneously change based on the weight values, updating of only one of the first output signals of the first neuron circuits and allows, when second output signals of second neuron circuits not interconnected simultaneously change, updating of the second output signals.

5 Claims, 8 Drawing Sheets

(56) References Cited

OTHER PUBLICATIONS

Geman Stuart et al. "Stochastic Relaxation, Gibbs Distributions, and the Bayesian Restoration of Images", IEEE Transactions on Pattern Analysis and Machine Intelligence, vol. PAMI-6, No. 6, pp. 721-741 (21 pages), Nov. 1984.

* cited by examiner

_US 10,891,542 B2_

ISING DEVICE AND CONTROL METHOD THEREOF

CROSS-REFERENCE TO RELATED APPLICATION

This application is based upon and claims the benefit of priority of the prior Japanese Patent Application No. 2016-112551, filed on Jun. 6, 2016, the entire contents of which are incorporated herein by reference.

FIELD

The embodiment discussed herein relates to an ising device and a control method thereof.

BACKGROUND

Neumann computers are not very suitable for solving multivariable optimization problems. However, to solve these problems, there is a method that uses an ising device (or a Boltzmann machine) that performs simulated annealing using an ising objective function. Such an ising device performs calculation by replacing a problem to be calculated with an ising model, which is a model representing the behavior of a ferromagnetic spin.

There is a conventional technique for realizing an ising device with hardware modules. In this technique, a plurality of neuron circuits are operated in a parallel manner, each of which simulates neuron functions. See, for example, the following documents:

Japanese Laid-open Patent Publication No. 3-100857
S. Geman and D. Geman, "Stochastic Relaxation, Gibbs Distributions, and the Bayesian Restoration of Images," IEEE Transactions on Pattern Analysis and Machine Intelligence, PAMI-6, pp. 721-741, 1984

It has been proved that convergence into an optimal solution is achieved when a state (an output value) of a single neuron circuit is updated at one time in a Boltzmann machine. However, it has not been proved that such convergence is achieved when states of a plurality of neuron circuits are simultaneously updated. Thus, when a plurality of neuron circuits are operated in a parallel manner, while improvement in the speed of the calculation processing can be expected, the convergence into an optimal solution could be deteriorated.

SUMMARY

According to one aspect, there is provided an ising device including: a plurality of neuron circuits which each calculate a first value based on a sum of products each obtained by multiplying one of a plurality of weight values each representing connection or disconnection between a corresponding neuron circuit and one of others of the plurality of neuron circuits, by a corresponding one of a plurality of output signals of the others of the plurality of neuron circuits, and output 0 or 1, based on a result of comparison between a second value obtained by adding a noise value to the first value and a threshold; and an arbitration circuit which allows, when a plurality of first output signals of a plurality of first neuron circuits interconnected among the plurality of neuron circuits simultaneously change based on the plurality of weight values, updating of only one of the first output signals of the plurality of first neuron circuits and allows, when a plurality of second output signals of a plurality of second neuron circuits not interconnected simultaneously change, updating of the plurality of second output signals.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
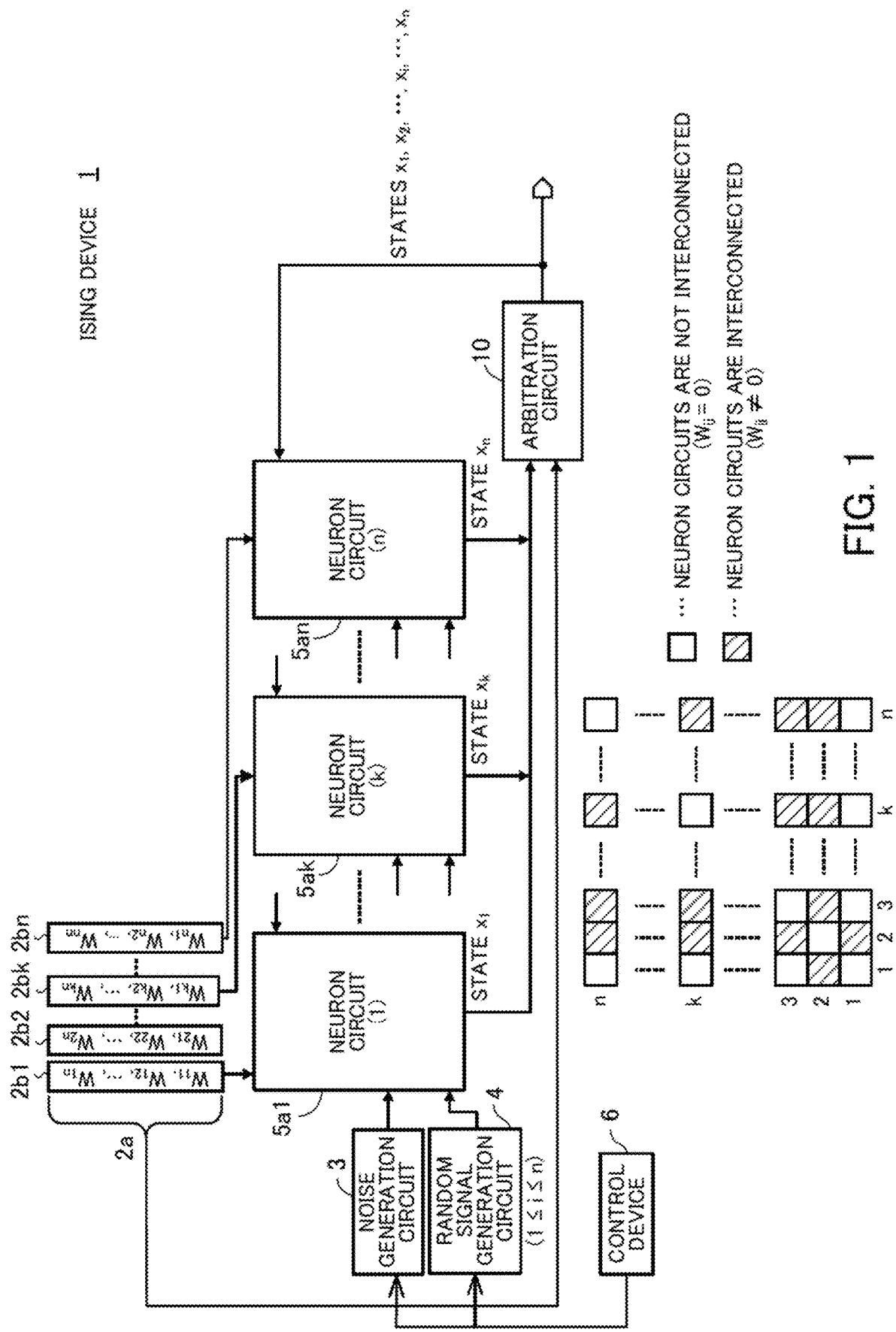
FIG. 1 illustrates an example of an ising device according to an embodiment.

An embodiment will be described below with reference to the accompanying drawings, wherein like reference characters refer to like elements throughout.

FIG. 1 illustrates an example of an ising device according to an embodiment.

An ising device 1 includes a register unit 2a, a noise generation circuit 3, a random signal generation circuit 4, a plurality of (n) neuron circuits 5a1 to 5an (5a1, 5ak, and 5an in FIG. 1), a control device 6, and an arbitration circuit 10. The ising device 1 is realized by a single semiconductor integrated circuit (a chip), for example.

The register unit 2a includes registers 2b1 to 2bn (2b1, 2b2, 2bk, and 2bn in FIG. 1). Each of the registers 2b1 to 2bn holds a plurality of weight values, each of which represents connection or disconnection between a corresponding one of the neuron circuits 5a1 to 5an and one of the other neuron circuits. For example, the register 2b1 holds weight values $W_{11}$ to $W_{1n}$, each of which represents connection or disconnection between the 1st neuron circuit 5a1 and one of the other neuron circuits. The register 2bk holds weight values $W_{k1}$ to $W_{kn}$, each of which represents connection or disconnection between the k-th neuron circuit 5ak and one of the other neuron circuits. The register 2bn holds weight values $W_{n1}$ to $W_{nn}$, each of which represents connection or disconnection between the n-th neuron circuit 5an and one of the other neuron circuits.

In addition, FIG. 1 also illustrates an example of an individual weight value $W_{ij}$ ($1 \leq i \leq n$, $1 \leq j \leq n$) in a matrix. Numbers (1st, 2nd, 3rd, k-th, and n-th in FIG. 1) of the neuron circuits 5a1 to 5an are indicated vertically and horizontally in FIG. 1. In the example in FIG. 1, a weight value $W_{ii}$ is 0, and a weight value $W_{ji}$ is equal to a weight value $W_{ij}$.

A weight value $W_{ij}$ represents connection or disconnection between the i-th and the j-th neuron circuits of the neuron circuits 5a1 to 5an. In addition, in FIG. 1, boxes that correspond to a weight value ($W_{ij} \neq 0$) associated with two neuron circuits interconnected are hatched. The other boxes that correspond to a weight value ($W_{ij}=0$) associated with two neuron circuits not interconnected are not hatched.

For example, in the example in FIG. 1, since the weight value $W_{12}$ associated with the 1st and 2nd neuron circuits 5*a*1 and 5*a*2 is not 0, it is seen that the neuron circuits 5*a*1 and 5*a*2 are interconnected. In contrast, in the example in FIG. 1, since the weight value $W_{1k}$ associated with the 1st and k-th neuron circuits 5*a*1 and 5*ak* is 0, it is seen that the neuron circuits 5*a*1 and 5*ak* are not interconnected.

The above weight values are suitably set depending on the problem to be calculated and are stored in the registers 2*b*1 to 2*bn*. In addition, since the weight value $W_{ii}$ is 0, the weight value is not stored in the registers 2*b*1 to 2*bn* in the example in FIG. 1. The above weight values may be stored in a semiconductor storage device such as a flash memory or a memory such as a random access memory (RAM), instead of being stored in the registers 2*b*1 to 2*bn*.

The noise generation circuit 3 is controlled by the control device 6 and outputs a noise value to each of the neuron circuits 5*a*1 to 5*an*. An example of the noise value will be described below.

The random signal generation circuit 4 is controlled by the control device 6 and outputs a selection signal for randomly selecting a plurality of neuron circuits to be enabled from the neuron circuits 5*a*1 to 5*an*.

For example, the random signal generation circuit 4 may include linear feedback shift registers (LFSRs). An example of the random signal generation circuit 4 will be described below with reference to FIG. 4.

Hereinafter, while an operation performed by the neuron circuit 5*a*1 will briefly be described, the other neuron circuits 5*a*2 to 5*an* also perform the same operation. First, the neuron circuit 5*a*1 calculates a value (which will hereinafter be referred to as a local field value) based on a sum of products, each of which is obtained by multiplying one of a plurality of weight values, each of which represents connection or disconnection between the neuron circuit 5*a*1 and one of the other neuron circuits 5*a*2 to 5*an*, by a corresponding one of output signals of the neuron circuits 5*a*1 to 5*an*.

Next, the neuron circuit 5*a*1 adds a noise value supplied from the noise generation circuit 3 to the local field value and compares this value obtained by the addition with a threshold (for example, 0). The neuron circuit 5*a*1 outputs 0 or 1 on the basis of the comparison result.

An example of the neuron circuit 5*a*1 to 5*an* will be described below with reference to FIG. 2.

The control device 6 controls the noise generation circuit 3 and the random signal generation circuit 4. For example, to realize simulated annealing, the control device 6 gradually decreases the amplitude of the noise value by controlling an amplifier circuit (not illustrated) included in the noise generation circuit 3. In addition, the control device 6 is connected to the register unit 2*a* via a bus (not illustrated) and writes the above weight values in the registers 2*b*1 to 2*bn* in the register unit 2*a*.

For example, the control device 6 may be realized by a processor. Examples of the processor include a central processing unit (CPU), a micro processing unit (MPU), a digital signal processor (DSP), an application specific integrated circuit (ASIC), and a programmable logic device (PLD). The processor may be a combination of at least two of a CPU, an MPU, a DSP, an ASIC, and a PLD. The control device 6 may be a personal computer (PC).

Of all the neuron circuits 5*a*1 to 5*an*, when a plurality of outputs signals (states) of a plurality of neuron circuits interconnected simultaneously change on the basis of the above plurality of weight values, the arbitration circuit 10 allows updating of only one of the states.

In this way, since the states of the plurality of neuron circuits interconnected are not updated simultaneously, the convergence into an optimal solution is improved.

As described above, by determining whether an individual weight value is 0 or not, a plurality of neuron circuits interconnected and a plurality of neuron circuits that are not interconnected are determined.

In addition, of all the neuron circuits 5*a*1 to 5*an*, when the states of a plurality of neuron circuits not interconnected simultaneously change on the basis of the above plurality of weight values, the arbitration circuit 10 allows updating of these states.

In this way, since the states of the plurality of neuron circuits that are not interconnected, namely, the states of the neuron circuits that do not affect the convergence, are updated simultaneously, the calculation time is shortened.

An example of the arbitration circuit 10 will be described below with reference to FIG. 5.

(Example of Neuron Circuits)

Figure 2:
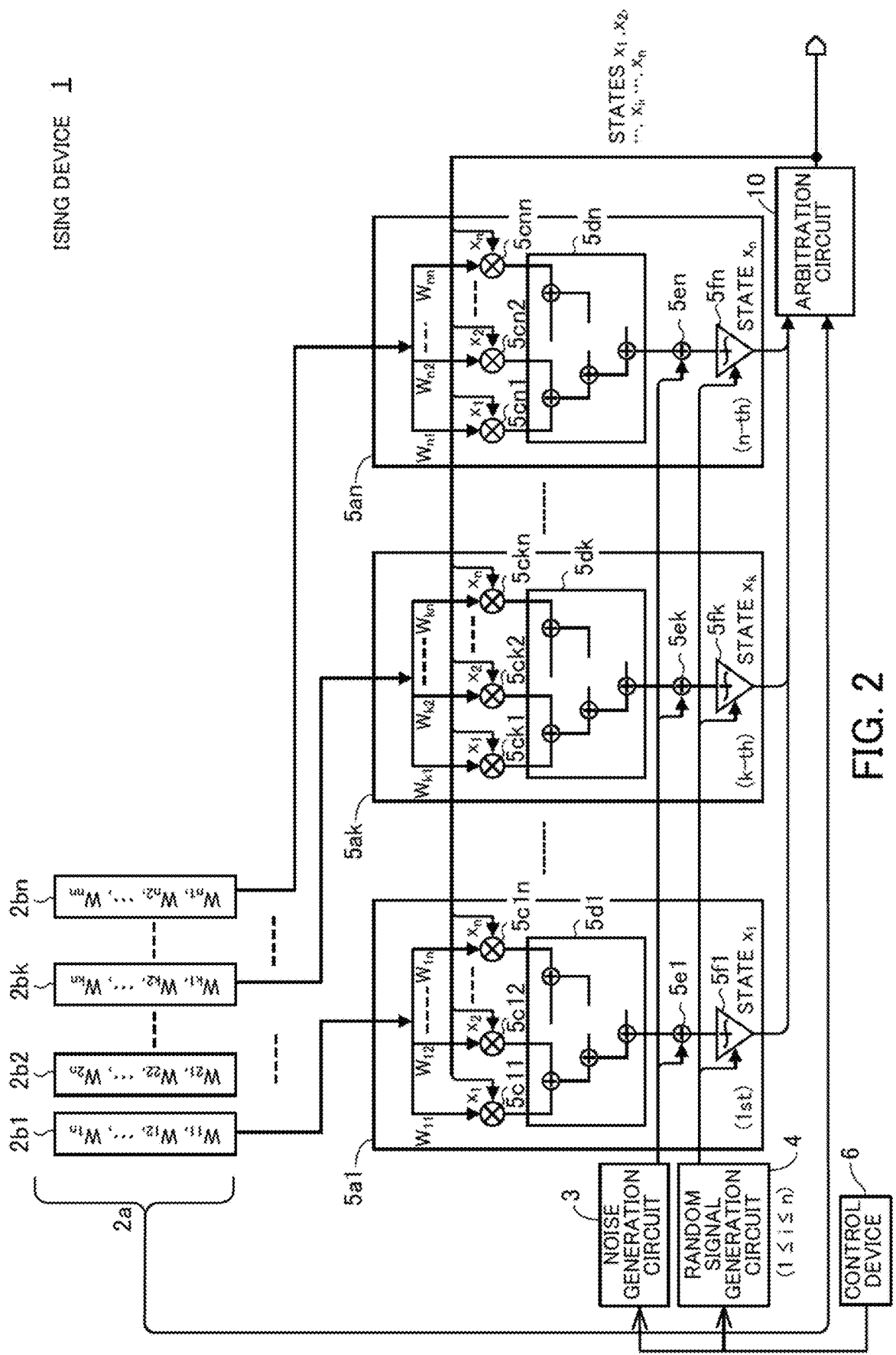
FIG. 2 illustrates an example of neuron circuits.

FIG. 2 illustrates an example of neuron circuits.

More specifically, FIG. 2 illustrates an example of the neuron circuits 5*a*1, 5*ak*, and 5*an* among the neuron circuits 5*a*1 to 5*an*.

The same elements between FIGS. 1 and 2 are denoted by the same reference characters, and description thereof will be omitted.

The neuron circuit 5*a*1 includes multiplier circuits 5*c*1*l* to 5*c*1*n*. The neuron circuit 5*ak* includes multiplier circuits 5*ck*1 to 5*ckn*. The neuron circuit 5*an* includes multiplier circuits 5*cn*1 to 5*cnn*. In addition, the neuron circuits 5*a*1 includes an adder circuit unit 5*d*1, an adder circuit 5*e*1, and a comparator circuit 5*f*1. The neuron circuit 5*ak* also includes an adder circuit unit 5*dk*, an adder circuit 5*ek*, and a comparator circuit 5*fk*. The neuron circuit 5*an* also includes an adder circuit unit 5*dn*, an adder circuit 5*en*, and a comparator circuit 5*fn*.

The multiplier circuits 5*c*1*l* to 5*c*1*n* output products of the weight values stored in the register 2*b*1 and states $x_1$ to $x_n$ (0 or 1) of the neuron circuits 5*a*1 to 5*an* outputted from the arbitration circuit 10. The multiplier circuits 5*ck*1 to 5*ckn* output products of the weight values stored in the register 2*bk* and the states $x_1$ to $x_n$ (0 or 1) of the neuron circuits 5*a*1 to 5*an* outputted from the arbitration circuit 10. The multiplier circuits 5*cn*1 to 5*cnn* output products of the weight values stored in the register 2*bn* and the states $x_1$ to $x_n$ (0 or 1) of the neuron circuits 5*a*1 to 5*an* outputted from the arbitration circuit 10.

The adder circuit unit 5*d*1 adds up the values outputted from the multiplier circuits 5*c*1*l* to 5*c*1*n* and outputs a sum. The adder circuit unit 5*dk* adds up the values outputted from the multiplier circuits 5*ck*1 to 5*ckn* and outputs a sum. The adder circuit unit 5*dn* adds up the values outputted from the multiplier circuits 5*cn*1 to 5*cnn* and outputs a sum.

The adder circuit 5*e*1 adds a noise value outputted from the noise generation circuit 3 to the value (the local field value) outputted from the adder circuit unit 5*d*1 and outputs a sum. The adder circuit 5*ek* adds a noise value outputted from the noise generation circuit 3 to the value outputted from the adder circuit unit 5*dk* and outputs a sum. The adder circuit 5*en* adds a noise value outputted from the noise generation circuit 3 to the value outputted from the adder circuit unit 5*dn* and outputs a sum.

The comparator circuit 5*f*1 is disabled (or enabled) by a selection signal supplied from the random signal generation circuit 4. When the value outputted from the adder circuit 5e1 is larger than a threshold (for example, 0), the comparator circuit 5f1 outputs 1 as the state $x_1$ of the neuron circuit 5a1. When the value outputted from the adder circuit 5e1 is equal to or less than the threshold, the comparator circuit 5f1 outputs 0 as the state $x_1$ of the neuron circuit 5a1. The comparator circuit 5fk is disabled (or enabled) by a selection signal supplied from the random signal generation circuit 4. When the value outputted from the adder circuit 5ek is larger than the threshold, the comparator circuit 5fk outputs 1 as the state $x_k$ of the neuron circuit 5ak. When the value outputted from the adder circuit 5ek is equal to or less than the threshold, the comparator circuit 5fk outputs 0 as the state $x_k$ of the neuron circuit 5ak. The comparator circuit 5fn is disabled (or enabled) by a selection signal supplied from the random signal generation circuit 4. When the value outputted from the adder circuit 5en is larger than the threshold, the comparator circuit 5fn outputs 1 as the state $x_n$ of the neuron circuit 5an. When the value outputted from the adder circuit 5en is equal to or less than the threshold, the comparator circuit 5fn outputs 0 as the state $x_n$ of the neuron circuit 5an.

The neuron circuits other than the neuron circuits 5a1, 5ak, and 5an are configured in the same way.

These neuron circuits 5a1 to 5an are hardware modules that realize an operation of an ising energy function. For example, an ising energy function E(x) is defined by the following expression (1).

$$E(x) = -\sum_{\langle i,j \rangle} W_{ij} x_i x_j - \sum_i b_i x_i \quad (1)$$

The first term on the right side of expression 1 is directed to all the combinations of two neuron circuits selectable from all the neuron circuits without missing any neuron circuit or redundantly counting any neuron circuit. More specifically, the first term represents the sum of products, each of which is obtained by multiplying states of two neuron circuits by a weight value associated with the two neuron circuits. As described above, $W_{ij}=W_{ji}$, and $W_{ii}=0$.

The second term on the right side of expression 1 represents the sum of products, each of which is obtained by multiplying a bias value of an individual one of the neuron circuits by a state of the individual one of the neuron circuits. In expression 1, $b_i$ represents the bias value of the i-th neuron circuit.

To express the above energy function E(x) by using hardware modules, the neuron circuits 5a1 to 5an illustrated in FIG. 2 calculate local field values $h_1$ to $h_n$, respectively. For example, the local field value $h_i$ of the i-th neuron circuit is expressed by the following expression (2).

$$h_i = \sum_j W_{ij} x_j + b_i \quad (2)$$

The first term on the right side of expression 2 represents the sum of products, each of which is obtained by multiplying a weight value representing connection or disconnection between the i-th neuron circuit and another one of the neuron circuits by a state of that neuron circuit.

When i=1, the local field value $h_i$ corresponds to the value outputted from the adder circuit unit 5d1. While the bias value is 0 in the example in FIG. 2, an adder circuit that adds a bias value to the value outputted from the adder circuit unit 5d1 may be arranged. The bias value is supplied from the control device 6, depending on the problem.

In the neuron circuits 5a1 to 5an as illustrated in FIG. 2, to perform simulated annealing, the comparator circuits 5f1 to 5fn compare the values obtained by adding noise values to the local field values $h_1$ to $h_n$ with the thresholds, respectively.

For example, the noise value is added so that a probability with which an individual one of the output values of the comparator circuits 5f1 to 5fn (the states $x_1$ to $x_n$ of the neuron circuits 5a1 to 5an) represents 1 accords with a sigmoid function. For example, the noise value is added so that a probability $P_i(h_i)$ with which the state $x_i$ of the i-th neuron circuit represents 1 satisfies the relationship of the following expression (3).

$$P_i(h_i)=1/[1+\exp(-h_i/T)] \quad (3)$$

In expression (3), T represents an effective temperature.

To obtain the probability $P_i(h_i)$ as illustrated in expression (3), a probability density function p(ns) of a noise value ns to be added is expressed by the following expression (4).

$$p(ns)=\exp(-h_i/T)[1+\exp(-h_i/T)]^2 \quad (4)$$

Figure 3:
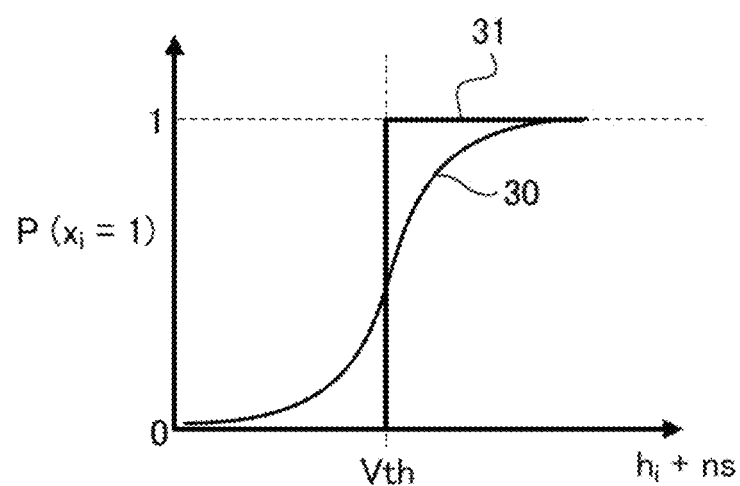
FIG. 3 illustrates an example of a probability $P_i(h_i)$ with which a state $x_i$ represents 1.

FIG. 3 illustrates an example of the probability $P_i(h_i)$ with which the state $x_i$ represents 1.

The horizontal axis represents a value obtained by adding the noise value ns to the local field value $h_i$, and the vertical axis represents the probability with which the state $x_i$ represents 1.

A waveform 30 indicates the probability $P_i(h_i)$ with which the state $x_i$ represents 1 when the noise value ns that accords with the probability density function p(ns) as illustrated in expression (4) is added to the local field value $h_i$. A waveform 31 indicates the probability $P_i(h_i)$ with which the state $x_i$ represents 1 when the noise value ns is not added to the local field value $h_i$.

As indicated by the waveform 31, if the noise value ns is not added to the local field value $h_i$, when the local field value $h_i$ is equal to or less than a threshold Vth, $P_i(h_i)=0$. However, when the local field value $h_i$ exceeds the threshold Vth, $P_i(h_i)=1$.

In contrast, as indicated by the waveform 30, if the noise value ns is added to the local field value $h_i$, the probability $P_i(h_i)$ changes with the sigmoid function.

Figure 4:
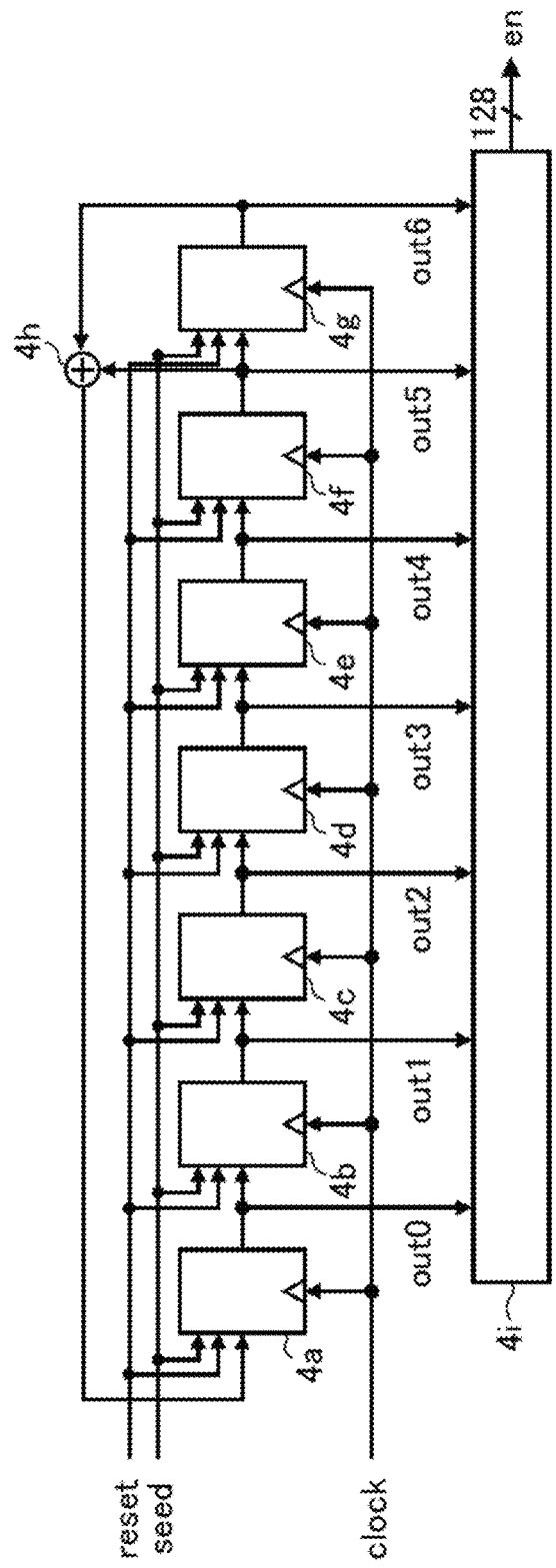
FIG. 4 illustrates an example of a random signal generation circuit.

Next, an example of the random signal generation circuit 4 will be described with reference to FIG. 4.

For example, the random signal generation circuit 4 includes LFSRs that generate a 7-bit random signal based on a primitive polynomial of degree 7 ($X^7+X^6+1$). The random signal generation circuit 4 includes registers 4a to 4g (flip flops), and an XOR circuit 4h, and a decoder circuit 4i.

The registers 4a to 4g are connected in series with each other. In addition, a signal line ("seed") for giving an initial value and a signal line ("reset") for setting an initial value are connected to each of the registers 4a to 4g. In addition, the registers 4a to 4g operate in synchronization with a clock signal, which is supplied from the control device 6, for example.

The XOR circuit 4h calculates an XOR operation on values outputted from the registers 4f and 4g and outputs an operation result. The XOR circuit 4h has an output terminal connected to an input terminal of the register 4a in the initial stage.

The decoder circuit 4i decodes the 7-bit random signal outputted from the output terminals (out0 to out6) of the registers 4a to 4g and outputs a 128-bit decode signal.

With the random signal generation circuit 4, a 7-bit random signal is outputted from the output terminals (out0 to out6) of the registers 4a to 4g, and the decoder circuit 4i decodes the random signal. Consequently, an individual one of the comparator circuit 5f1 to 5fn in the neuron circuits 5a1 to 5an (n=128) is enabled or disabled. For example, when the least significant bit of an output terminal en represents 0, the comparator circuit 5f1 is disabled.

The noise generation circuit 3 may also be realized by using LFSRs.

(Example of Arbitration Circuit 10)

Figure 5:
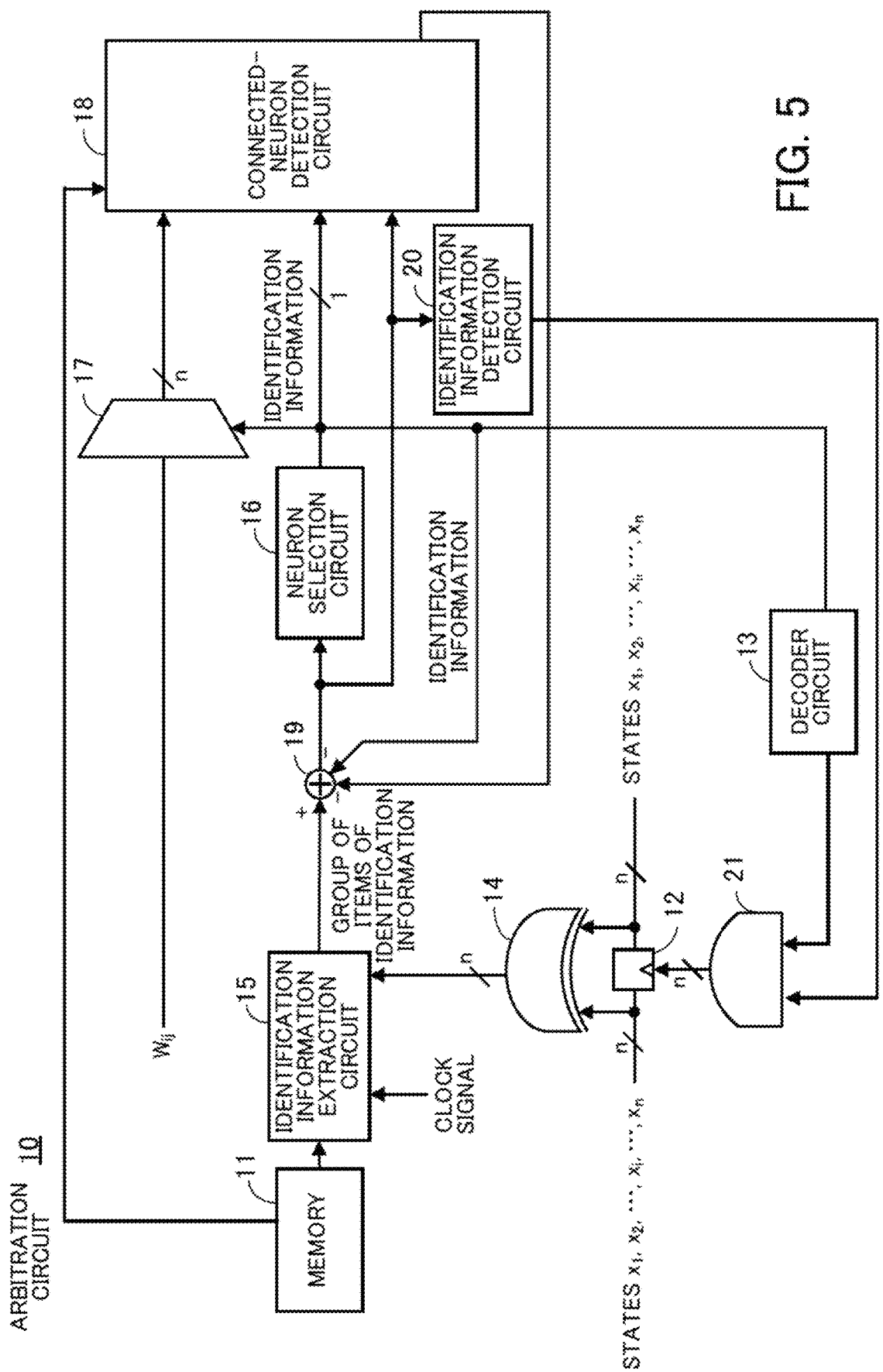
FIG. 5 illustrates an example of an arbitration circuit.

FIG. 5 illustrates an example of the arbitration circuit 10.

The arbitration circuit 10 includes a memory 11, a register unit 12, a decoder circuit 13, an XOR circuit unit 14, an identification information extraction circuit 15, a neuron selection circuit 16, a selection circuit 17, a connected-neuron detection circuit 18, an adder circuit 19, an identification information detection circuit 20, and an AND circuit unit 21.

The memory 11 holds a group of items of identification information, each of which identifies one of the neuron circuits 5a1 to 5an. For example, a semiconductor storage device such as a flash memory or a RAM may be used as the memory 11.

The register unit 12 includes n registers in which the states $x_1$ to $x_n$ of the neuron circuits 5a1 to 5an are stored. When the identification information detection circuit 20 outputs an H (High) level signal, a corresponding one of the n registers in the register unit 12 captures only the state $x_i$ selected by the neuron selection circuit 16 in synchronization with a signal supplied from the AND circuit unit 21.

The decoder circuit 13 outputs a decode output signal on the basis of identification information about a single neuron circuit selected by the neuron selection circuit 16.

The XOR circuit unit 14 includes n XOR circuits, which correspond to the n registers of the register unit 12. For example, the i-th XOR circuit performs an XOR operation on input and output values of the i-th register and outputs an operation result. In this way, the i-th XOR circuit detects change of the state $x_i$ of the i-th neuron circuit. For example, when the state $x_i$ of the i-th neuron circuit has changed from the corresponding value stored in the i-th register to a different value, the i-th XOR circuit outputs 1. In contrast, when the state $x_i$ of the i-th neuron circuit has not changed from the corresponding value stored in the i-th register, the i-th XOR circuit outputs 0.

In this way, the XOR circuit unit 14 outputs values representing change of the states $x_1$ to $x_n$ of the neuron circuit 5a1 to 5an, respectively.

The identification information extraction circuit 15 reads the group of items of identification information stored in the memory 11 in synchronization with a clock signal. In addition, on the basis of a result outputted from the XOR circuit unit 14, the identification information extraction circuit 15 extracts items of identification information about neuron circuits whose states have changed from the group of items of identification information. The following description assumes that the states of a plurality of neuron circuits have changed. Namely, the identification information extraction circuit 15 extracts a group of items of identification information about a plurality of neuron circuits whose states have changed from the group of items of identification information read from the memory 11.

The neuron selection circuit 16 selects identification information about a single neuron circuit from the group of items of identification information extracted by the identification information extraction circuit 15. For example, from the group of items of identification information, the neuron selection circuit 16 randomly selects identification information about a single neuron circuit or selects identification information representing a minimum (or maximum) value.

The selection circuit 17 selects weight values, each of which represents connection or disconnection between the neuron circuit corresponding to the identification information selected by the neuron selection circuit 16 and one of the other neuron circuits, from the plurality of weight values stored in the register unit 2a.

The connected-neuron detection circuit 18 refers to the weight values selected by the selection circuit 17 and determines weight values that represent 0. Namely, the connected-neuron detection circuit 18 detects other neuron circuits interconnected to the neuron circuit corresponding to the identification information selected by the neuron selection circuit 16. Next, from the memory 11, the connected-neuron detection circuit 18 acquires identification information about the other neuron circuits detected and outputs the acquired identification information.

The adder circuit 19 excludes the identification information about the neuron circuit selected by the neuron selection circuit 16 and the identification information outputted by the connected-neuron detection circuit 18 from the group of items of identification information outputted by the identification information extraction circuit 15.

The identification information detection circuit 20 detects whether any identification information has been outputted by the adder circuit 19. For example, the identification information detection circuit 20 outputs a signal that changes from an L (Low) level to an H (High) level each time the identification information detection circuit 20 detects identification information.

The AND circuit unit 21 includes n AND circuits which correspond to the n registers of the register unit 12. For example, the i-th AND circuit performs an AND operation on the H-level signal outputted from the identification information detection circuit 20 and the decode output signal based on the identification information about the i-th neuron circuit supplied by the decoder circuit 13 and outputs an operation result to the i-th register. In this way, the i-th AND circuit updates the state $x_i$ of the i-th neuron circuit.

Next, control processing performed by the above ising device 1 will be described with reference to FIG. 6. The ising device 1 performs this processing when calculating a problem.

Figure 6:
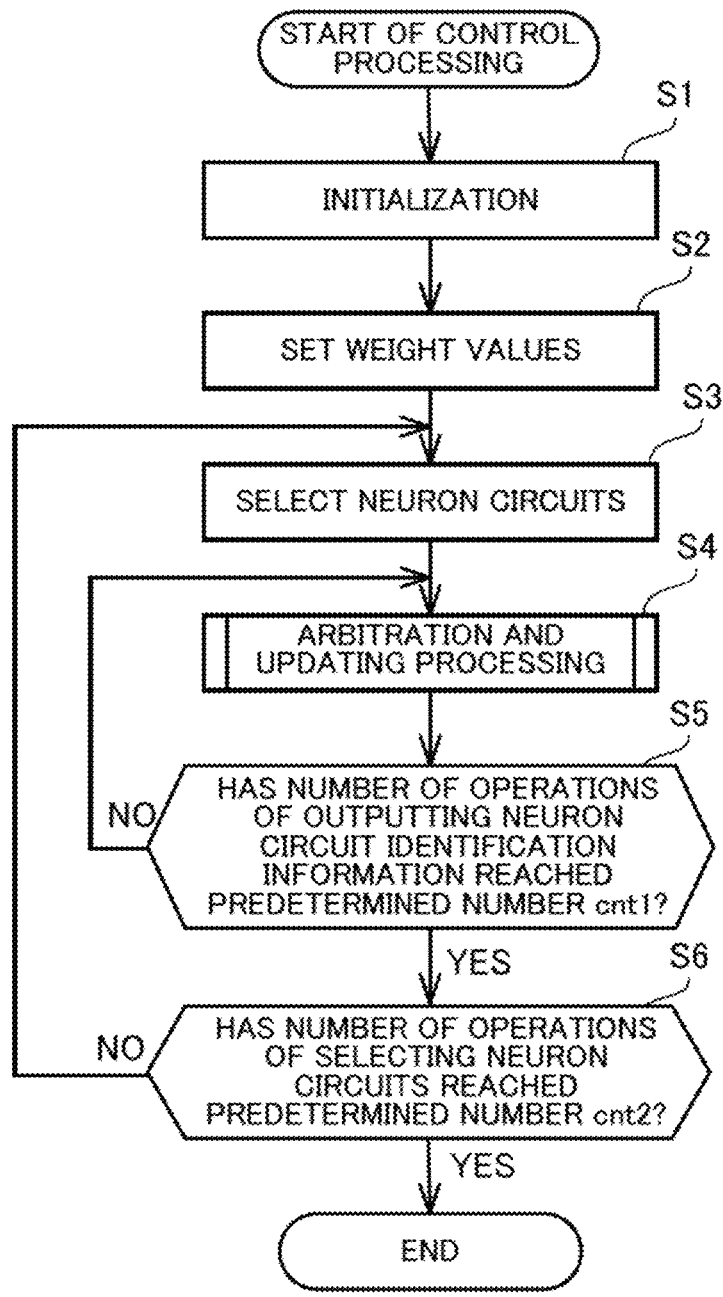
FIG. 6 is a flowchart illustrating an example of control processing performed by the ising device.

FIG. 6 is a flowchart illustrating an example of control processing performed by the ising device.

[Step S1] The control device 6 initializes the register unit 2a, etc.

[Step S2] The control device 6 sets weight values based on a problem to be calculated in each of the registers 2b1 to 2bn of the register unit 2a.

These weight values are supplied to the arbitration circuit 10.

[Step S3] The control device 6 causes the random signal generation circuit 4 to output a selection signal, to select (enable) a plurality of neuron circuits randomly.

To realize simulated annealing, each time the control device 6 performs the selection of neuron circuits, the control device 6 decreases the amplitude of the noise value by controlling the amplifier circuit (not illustrated) included in the noise generation circuit 3.

Next, simulated annealing will be described with reference to FIG. 7.

Figure 7:
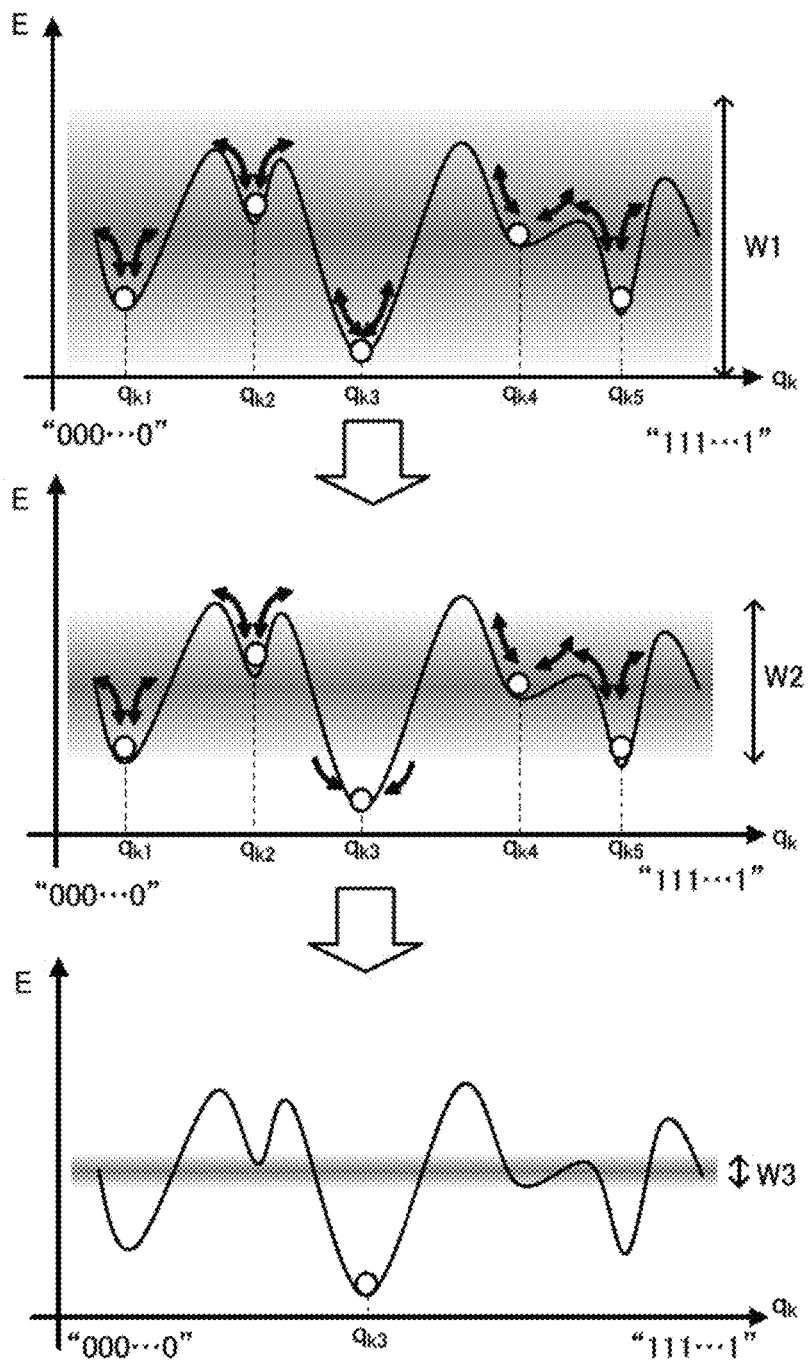
FIG. 7 illustrates progress of simulated annealing.

FIG. 7 illustrates progress of simulated annealing.

The vertical axis represents energy E, and the horizontal axis represents combinations $q_K$ of states of all the neuron circuits. The combinations $q_K$ are represented by "000 . . . 0" to "111 . . . 1". FIG. 7 illustrates how the convergence into an optimal solution is achieved as the noise amplitude is decreased from W1 to W3. Decreasing the noise amplitude means decreasing the effective temperature T in expression (4).

When the noise amplitude is W1, even when an individual solution reaches a local solution $q_{k1}$, $q_{k2}$, $q_{k4}$, or $q_{k5}$ (a solution when the energy represents a local minimal value), the local solution can change in the direction of higher energy. Thus, these solutions can shift from the local solutions. As the noise amplitude gradually decreases to W2 and W3, the change of the individual solution is also gradually limited, and the convergence into an optimal solution $q_{k3}$ (a solution when the energy represents a minimum value) is finally achieved.

[Step S4] In step S4, the arbitration circuit 10 performs arbitration and updating processing. This processing in step S4 will be described below.

[Step S5] The control device 6 determines whether the number of operations of outputting identification information about an individual neuron circuit allowed to be updated by the arbitration circuit 10 has reached a predetermined number cnt1.

If so (YES in step S5), the processing proceeds to step S6. If not (NO in step S5), the processing returns to step S4.

[Step S6] The control device 6 determines whether the number of operations of selecting neuron circuits in step S3 has reached a predetermined number cnt2.

If so (YES in step S6), the control device 6 ends the control processing. If not (NO in step S6), the processing returns to step S3.

Next, the arbitration and updating processing performed by the arbitration circuit 10 illustrated in FIG. 5 will be described with reference to FIG. 8.

Figure 8:
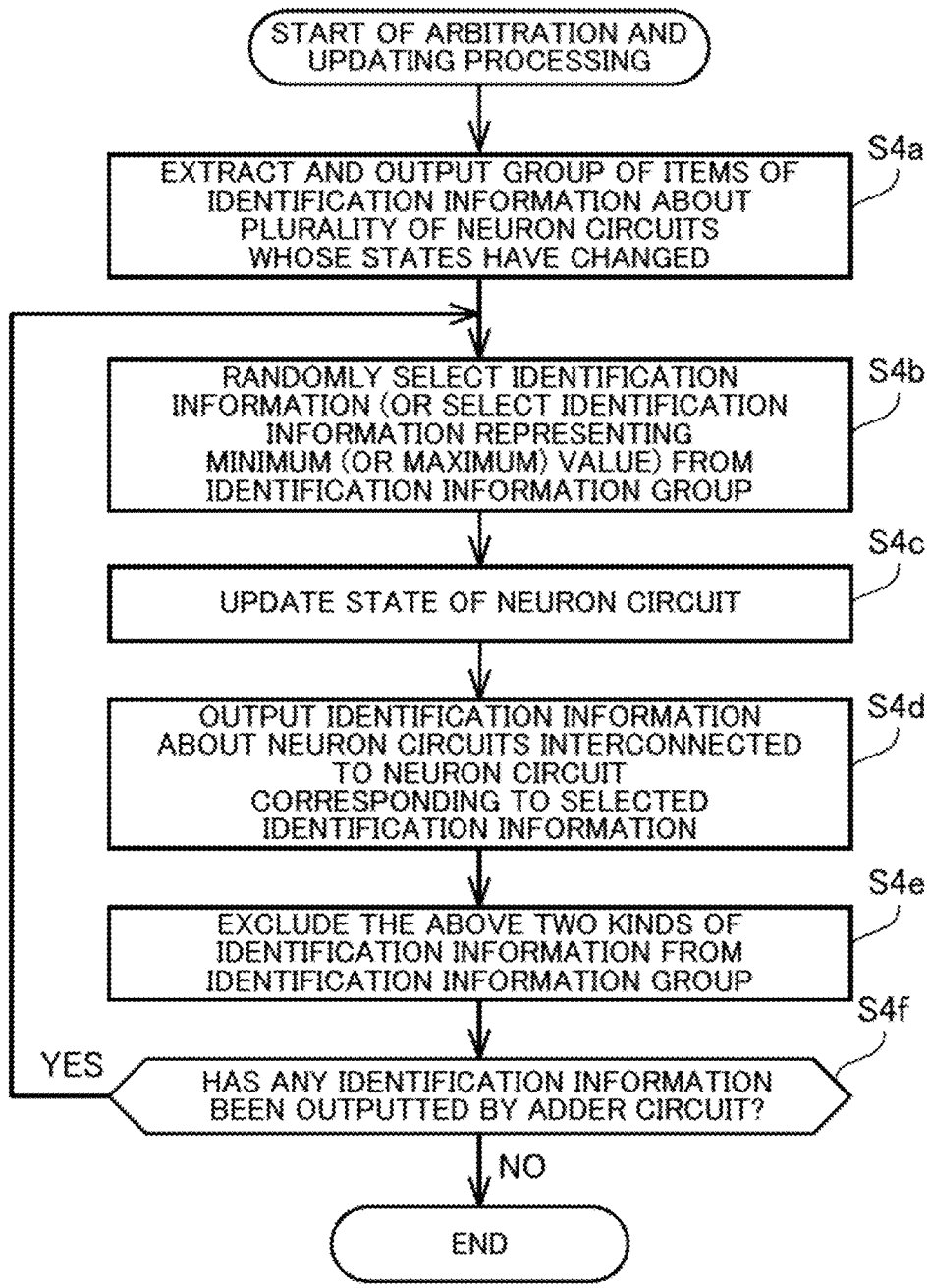
FIG. 8 is a flowchart illustrating an example of arbitration and updating processing performed by the arbitration circuit.

FIG. 8 is a flowchart illustrating an example of the arbitration and updating processing performed by the arbitration circuit 10.

[Step S4a] The identification information extraction circuit 15 reads the group of items of identification information from the memory 11 in synchronization with a clock signal. In addition, on the basis of the output result from the XOR circuit unit 14, the identification information extraction circuit 15 extracts a group of items of identification information including identification information about a plurality of neuron circuits whose states have changed from the group of items of identification information read from the memory 11. The identification information extraction circuit 15 outputs the extracted identification information.

[Step S4b] The neuron selection circuit 16 selects identification information about a single neuron circuit from the group of items of identification information extracted by the identification information extraction circuit 15. For example, from the group of items of identification information, the neuron selection circuit 16 randomly selects identification information about a single neuron circuit or selects identification information representing a minimum (or maximum) value.

[Step S4c] When any identification information has been outputted by the adder circuit 19, the identification information detection circuit 20 outputs an H-level signal. The decoder circuit 13 outputs a decode output signal on the basis of the identification information about the single neuron circuit selected by the neuron selection circuit 16. The AND circuit unit 21 performs an AND operation on the basis of the H-level signal and the decode output signal and outputs signals indicating the operation result. Depending on the signals outputted by the AND circuit unit 21, the n registers of the register unit 12 update the state $x_i$ corresponding to the identification information selected by the neuron selection circuit 16 and outputs the updating result.

[Step S4d] The connected-neuron detection circuit 18 refers to the weight values selected by the selection circuit 17 and determines which one of the weight values represents 0. Namely, the connected-neuron detection circuit 18 detects other neuron circuits interconnected to the neuron circuit corresponding to the identification information selected by the neuron selection circuit 16. Next, from the memory 11, the connected-neuron detection circuit 18 acquires identification information about the other neuron circuits detected and outputs the acquired identification information.

[Step S4e] The adder circuit 19 excludes the identification information about the neuron circuit selected by the neuron selection circuit 16 and the identification information outputted by the connected-neuron detection circuit 18 from the group of items of identification information outputted by the identification information extraction circuit 15.

[Step S4f] The identification information detection circuit 20 detects (determines) whether any identification information has been outputted by the adder circuit 19. If any identification information has been outputted (YES in step S4f), the processing returns to step S4b. If not (NO in step S4f), the arbitration circuit 10 ends the arbitration and updating processing.

In this way, among the states $x_1$ to $x_n$ outputted by the respective neuron circuits 5a1 to 5an, the state $x_i$ corresponding to the identification information selected by the neuron selection circuit 16 is updated and outputted.

As a result, since the states of a plurality of neuron circuits interconnected are not updated simultaneously, the convergence into an optimal solution is not deteriorated. In addition, since the states of a plurality of neuron circuits that are not interconnected, namely, a plurality of neuron circuits that do not affect the convergence, are updated simultaneously, the calculation time is shortened. In other words, even when the plurality of neuron circuits 5a1 to 5an in the ising device 1 are operated in a parallel manner, the calculation time is shortened without adversely affecting the convergence into an optimal solution.

In an optimization problem, as many as $10^3$ to $10^6$ variables could be used, and the calculation time could be extended significantly. In particular, as the processing comes close to the convergence into an optimal solution, since the number of neuron circuits able to decrease the overall energy by the updating of the states is decreased, the probability with which an effective neuron circuit can be selected by random selection from all the neuron circuits is decreased. Thus, operations of unnecessary neuron circuits whose states do not change are increased, and the calculation time is extended significantly. In practice, effective updating is performed one in $10^3$ operations or less.

However, with the ising device 1 according to the present embodiment, for example, when 1,000 neuron circuits are operated in a parallel manner, the probability with which neuron circuits whose states change are detected is improved 1000 times. In this way, the probability with which the operations of unnecessary neuron circuits whose states have not changed occur, the operations conventionally occupying much of the calculation time, is decreased to $\frac{1}{1000}$. Namely, the calculation time is shortened significantly.

An individual neuron circuit is not limited to the circuit configuration illustrated in FIG. 2. For example, a circuit configuration based on an algorithm called "DeGloria algorithm" may be used. An individual neuron circuit based on the DeGloria algorithm holds a value (a local field value) based on a sum of values, each of which is obtained by multiplying a weight value representing connection or disconnection between the corresponding neuron circuit and one of the other neuron circuits by states of a plurality of other neuron circuits. In addition, the individual neuron circuit outputs 0 or 1 on the basis of a result of comparison between a value obtained by adding a noise value to the local field value and a threshold (for example, 0). In addition, when the state of another neuron circuit changes, a neuron circuit specified by identification information supplied by the arbitration circuit 10 obtains a change amount of the local field value on the basis of the changed state of the neuron circuit and updates the local field value by adding or subtracting the change amount to or from the local field value prior to the state change. When states of a plurality of neuron circuits change, the arbitration circuit 10 outputs identification information about only one of a plurality of neuron circuits interconnected. In addition, when states of a plurality of neuron circuits change, the arbitration circuit 10 outputs identification information about a plurality of neuron circuits not interconnected. In this way, the same advantageous effect as that obtained by using the circuit configuration illustrated in FIG. 2 for the neuron circuits is obtained.

While an ising device and a control method thereof according to one aspect have been described on the basis of an embodiment, the above description represents only an example. The present technique is not limited to the above description.

According to one aspect, the convergence into an optimal solution is improved.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An ising device comprising:
a plurality of neuron circuits which each calculate a first value based on a sum of products each obtained by multiplying one of a plurality of weight values each representing connection or disconnection between a corresponding neuron circuit and one of others of the plurality of neuron circuits, by a corresponding one of a plurality of state values each representing a state of one of the others of the plurality of neuron circuits, and output 0 or 1, based on a result of comparison between a second value obtained by adding a noise value to the first value and a threshold; and
an arbitration circuit which stores a group of state values each representing a state of one of the plurality of neuron circuits, the arbitration circuit is configured to:
 detect, based on the plurality of weight values, a plurality of first output signals of a plurality of first neuron circuits interconnected among the plurality of neuron circuits simultaneously change, and allow updating of only one of a plurality of first state values of the plurality of first neuron circuits among the group of state values,
 detect, based on the plurality of weight values, a plurality of second neuron circuits not interconnected among the plurality of neuron circuits simultaneously change, and
 allow updating of a plurality of second state values of the plurality of second neuron circuits among the group of state values.

2. The ising device according to claim 1, wherein
the arbitration circuit generates first identification information that identifies one of the plurality of first neuron circuits, and
among the plurality of neuron circuits, a third neuron circuit corresponding to the first identification information performs updating, based on the plurality of state values.

3. The ising device according to claim 2, comprising:
a memory that holds a group of items of identification information that respectively identifies the plurality of neuron circuits,
wherein the arbitration circuit reads the group of items of identification information from the memory, extracts a group of items of first identification information that respectively identifies the plurality of first neuron circuits from the group of items of identification information, and randomly selects the first identification information from the group of items of first identification information or selects first identification information having a maximum or minimum value from the group of items of first identification information.

4. The ising device according to claim 3, wherein the arbitration circuit extracts second identification information that identifies a fourth neuron circuit connected to the third neuron circuit based on the plurality of weight values from the group of items of identification information and excludes the second identification information from the group of items of first identification information.

5. A control method of an ising device, the method comprising:
for the ising device including
 a plurality of neuron circuits which each calculate a first value based on a sum of products each obtained by multiplying one of a plurality of weight values each representing connection or disconnection between a corresponding neuron circuit and one of others of the plurality of neuron circuits, by a corresponding one of a plurality of state values each representing a state of one of the others of the plurality of neuron circuits and output 0 or 1, based on a result of comparison between a second value obtained by adding a noise value to the first value and a threshold, and
 an arbitration circuit which stores a group of state values each representing a state of one of the plurality of neuron circuits, the arbitration circuit is configured to:
 detect, based on the plurality of weight values, a plurality of first output signals of a plurality of first neuron circuits interconnected among the plurality of neuron circuits simultaneously change, and allow updating of only one of a plurality of first state values of the plurality of first neuron circuits among the group of state values, and
 detect, based on the plurality of weight values, a plurality of second neuron circuits not interconnected among the plurality of neuron circuits simultaneously change, and allow updating of a plurality of second state values of the plurality of second neuron circuits among the group of state values, setting, by a control device coupled to the ising device, the plurality of weight values;

causing, by the control device, a random signal generation circuit to randomly select the plurality of first neuron circuits or the plurality of second neuron circuits to be enabled among the plurality of neuron circuits; and controlling, by the control device, an amplitude of the noise value outputted by a noise generation circuit.

\* \* \* \* \*